United States Patent
Howes et al.

(10) Patent No.: US 6,445,704 B1
(45) Date of Patent: Sep. 3, 2002

(54) METHOD AND APPARATUS FOR VIRTUALIZING A LOCALLY INITIATED OUTBOUND CONNECTION FROM A CONNECTION MANAGER

(75) Inventors: Richard A. Howes, Roswell; Edward C. Kersey, Athens, both of GA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/107,238

(22) Filed: Jun. 30, 1998

Related U.S. Application Data

(63) Continuation-in-part of application No. 08/918,024, filed on Aug. 25, 1997, now Pat. No. 6,108,300, and a continuation-in-part of application No. 08/920,211, filed on Aug. 25, 1997, now Pat. No. 5,989,060, and a continuation-in-part of application No. 08/850,248, filed on May 2, 1997, now Pat. No. 6,317,775, and a continuation-in-part of application No. 08/850,730, filed on May 2, 1997, now Pat. No. 6,061,349, and a continuation-in-part of application No. 08/850,836, filed on May 2, 1997, now Pat. No. 6,104,717.

(51) Int. Cl.[7] .............................................. H04L 12/56
(52) U.S. Cl. ........................ 370/392; 370/401; 370/471; 709/203
(58) Field of Search ................................. 370/389, 392, 370/393, 397, 399, 401, 409, 464, 465, 471, 475, 400; 709/203, 217, 218, 219

(56) References Cited

U.S. PATENT DOCUMENTS

| | | | | |
|---|---|---|---|---|
| 5,371,852 A | | 12/1994 | Attanasio et al. | 709/245 |
| 5,444,848 A | * | 8/1995 | Johnson, Jr. et al. | 709/241 |
| 5,617,417 A | | 4/1997 | Sathe et al. | 370/394 |
| 5,774,660 A | * | 6/1998 | Brendel et al. | 709/201 |
| 5,917,997 A | * | 6/1999 | Bell et al. | 714/4 |
| 5,923,854 A | * | 7/1999 | Bell et al. | 709/243 |
| 5,935,249 A | * | 8/1999 | Stern et al. | 713/201 |
| 5,951,650 A | * | 9/1999 | Bell et al. | 709/238 |

FOREIGN PATENT DOCUMENTS

WO    WO 97/05727    2/1997

OTHER PUBLICATIONS

Web Page for Coyote Point Systems © 1997; www.coyote-point.com.

\* cited by examiner

*Primary Examiner*—Chau Nguyen
*Assistant Examiner*—Soon-Dong Hyun
(74) *Attorney, Agent, or Firm*—Van Plet & Yi LLP

(57) ABSTRACT

A system and method are disclosed for virtualizing locally initiated outbound connections from a physical machine used to implement a virtual machine. The method includes providing a virtual machine object having a virtual IP address that corresponds to the virtual machine. Inbound connections directed to the virtual machine are handled by the physical machine having a physical machine IP address. A static physical machine object is also provided. The static physical machine object contains the virtual IP address and the physical machine IP address. When a SYN packet is intercepted for an outbound connection having a SYN packet source IP address that corresponds to the physical machine IP address and a packet destination address that corresponds to a foreign IP address, it is determined whether the packet source IP address matches the physical machine IP address. If the packet source IP address matches the physical machine IP address, then a connection object is created for handling outbound connections from the physical machine IP address. A counter in a physical machine object is incremented when the connection object is created so that the locally generated connection may be considered for the purpose of load balancing new remotely generated connections.

46 Claims, 12 Drawing Sheets

Remotely generated packet

Locally generated packet

METHOD AND APPARATUS FOR VIRTUALIZING A LOCALLY INITIATED OUTBOUND CONNECTION FROM A CONNECTION MANAGER

CROSS REFERENCE TO RELATED APPLICATIONS

This application is a continuation in part of U.S. patent application Ser. No. 08/850,248 filed on May 2, 1997, SYSTEM FOR DISTRIBUTING LOAD OVER MULTIPLE SERVERS AT AN INTERNET SITE, by Brantley W. Coile, et al., now U.S. Pat. No. 6,317,775; and U.S. patent application Ser. No. 08/850,730 filed on May 2, 1997, SYSTEM AND METHOD FOR IMPLEMENTING MULTIPLE IP ADDRESSES ON MULTIPLE PORTS, by Brantley W. Coile, et al., now U.S. Pat. No. 6,061,349; and U.S. patent application Ser. No. 08/850,836 filed on May 2, 1997, SYSTEM AND METHOD FOR PROVIDING BACKUP MACHINES FOR IMPLEMENTING MULTIPLE IP ADDRESSES ON MULTIPLE PORTS, by Brantley W. Coile, et al., now U.S. Pat. No. 6,104,717; and U.S. patent application Ser. No. 08/918,024 filed on Aug.25, 1997, METHOD AND APPARATUS FOR TRANSPARENTLY PROVIDING A FAILOVER NETWORK DEVICE, by Brantley W. Coile, et al., now U.S. Pat. No. 6,108,300; and U.S. patent application Ser. No. 08/920,211 filed on Aug. 25, 1997, SYSTEM AND METHOD FOR DIRECT COMMUNICATION WITH A BACKUP NETWORK DEVICE VIA A FAILOVER CABLE, by Brantley W. Coile, et al., now U.S. Pat. No. 5,989,060; which are each incorporated herein by reference for all purposes.

This application is related to co-pending U.S. patent application Ser. No. 09/107,261, METHOD AND APPARATUS FOR MAINTAINING CONNECTION STATE BETWEEN A CONNECTION MANAGER AND A FAILOVER DEVICE, by Richard A. Howes, et al. filed Jun. 30, 1998 and U.S. patent application Ser. No. 09/107,244, METHOD AND APPARATUS FOR MANAGING CONNECTIONS BASED ON A CLIENT IP ADDRESS by Richard A. Howes, et al. filed Jun. 30, 1998, now U.S. Pat. No. 6,324,177, which are each incorporated herein by reference for all purposes.

BACKGROUND OF THE INVENTION

1. Field of the Invention

The present invention relates generally to a virtual connection manager that maintains virtual connections from outside machines to a local machine or group of machines. Locally initiated outbound connections from the physical machines that are established with designated outside machines are virtualized. The source IP address of the packets sent on the connection is changed to a virtual IP address that corresponds to a virtual machine. The existence of the outbound locally initiated connections may be taken into consideration when inbound remotely initiated connections are assigned to an available physical machine using a load balancing scheme.

2. Relationship to the Art

A Local Director connection manager that manages connections from remote clients to a local group of web servers is described in the patent applications referenced above. The Local Director manages requests from remote clients to IP addresses corresponding to virtual machines implemented on the Local Director by translating the destination IP address and port number of incoming packets to the destination IP address and port number of a real machine (also referred to as a physical machine) that the Local Director has at its disposal to handle connections for the virtual machines that the Local Director is implementing. Likewise, the Local Director simulates responses from the virtual machines to the remote clients by translating the source IP address and port number of the real machines that the Local Director has at its disposal to the source IP address and port numbers of the virtual machines that the Local Director is implementing.

Thus, the outside clients establish a connection that appears to be a connection to a virtual machine corresponding to destination IP address and destination port number selected by the client. The Local Director translates IP addresses and port numbers of inbound and outbound packets so that packets from the client are directed to a real machine that is selected by the Local Director to handle the virtual connection and packets from the real machine appear to the client to have originated from the virtual machine.

It should be noted that the terms client and server are used to refer to remote machines and local machines, respectively. In certain systems, the client and server designations may actually be reversed and it should be remembered that the following description could equally apply to a local virtual clients and remote servers. Furthermore, although the invention will be specifically described as relating to the Local Director it should be appreciated that the method and apparatus described herein would be applicable to other connection managers that maintain information about the state of various virtual connections. Therefore, the terms Local Director and connection manager are used interchangeably throughout this specification.

Two important functions that the Local Director performs are efficiently allocating or load balancing new connections from outside clients among the group of physical machines that are available to handle connections and hiding the physical machine IP addresses from the outside clients. As described above, these functions are performed for all connections from outside clients made to virtual IP addresses supported by the Local Director.

It would also be useful if locally generated connections initiated by physical machines that are connected to the Local Director could selectively be virtualized, that is, have the source IP address in packets that correspond to such connections be translated into a virtual IP address. Translating the source IP address for packets sent by the physical machines for remotely initiated connections causes clients to believe they are communicating with a virtual machine. It would be useful if translating the source IP addresses of packets for locally generated connections could cause clients to believe that a virtual machine has initiated a connection.

Load balancing of locally initiated connections is not necessary since the physical machine that is initiating the connection will be the physical machine that is assigned to the connection. However, it would be useful if locally initiated connections could be considered when load balancing new remotely initiated connections among a group of physical machines. A physical machine that is available to the Local Director may in some cases have a significant portion or even a majority of its processing resources devoted to handling connections initiated by the physical machine. For example, if FTP is being used, then a client may initiate a control connection that requires only a small amount of bandwidth. As a result of the control connection, an individual physical server may then initiate a data connection that requires much greater bandwidth.

What is needed, therefore, is a system and method for virtualizing locally generated connections and for providing a load balancing scheme that factors in locally generated connections when a remotely generated connection is being allocated to a local physical machine.

SUMMARY OF THE INVENTION

Accordingly, a system and method has been developed for designating certain physical machines as physical machines that will be virtualized when those physical machines initiate outside connections. A static physical machine object data structure keeps track of the virtual source address that replaces the physical machine IP address and packets sent by the physical machine. A pointer may be included to a physical machine object that represents the physical machine if the physical machine is also available to handle incoming connections that were initiated by a remote party. The pointer to the physical machine object is used to update the physical machine object number of connections so that connections initiated by the physical machine may be counted for the purpose of load balancing. When a SYN packet is intercepted by the Local Director, it checks to see if the source IP address of the packet corresponds to a static physical machine data structure. If it does, then a static connection object is created and other packets received for that connection are translated according to the information in the static connection object.

It should be appreciated that the present invention can be implemented in numerous ways, including as a process, an apparatus, a system, a device, a method, or a computer readable medium. Several inventive embodiments of the present invention are described below.

In one embodiment, locally initiated outbound connections from a physical machine used to implement a virtual machine are virtualized. The virtualization method includes providing a virtual machine object having a virtual IP address that corresponds to the virtual machine. Inbound connections directed to the virtual machine are handled by the physical machine having a physical machine IP address. A static physical machine object is also provided. The static physical machine object contains the virtual IP address and the physical machine IP address. When a SYN packet is intercepted for an outbound connection having a SYN packet source IP address that corresponds to the physical machine IP address and a packet destination address that corresponds to a foreign IP address, it is determined whether the packet source IP address matches the physical machine IP address. If the packet source IP address matches the physical machine IP address, then a connection object is created for handling outbound connections from the physical machine IP address. A counter in a physical machine object is incremented when the connection object is created so that the locally generated connection may be considered for the purpose of load balancing new remotely generated connections.

These and other features and advantages of the present invention will be presented in more detail in the following specification of the invention and the accompanying Figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
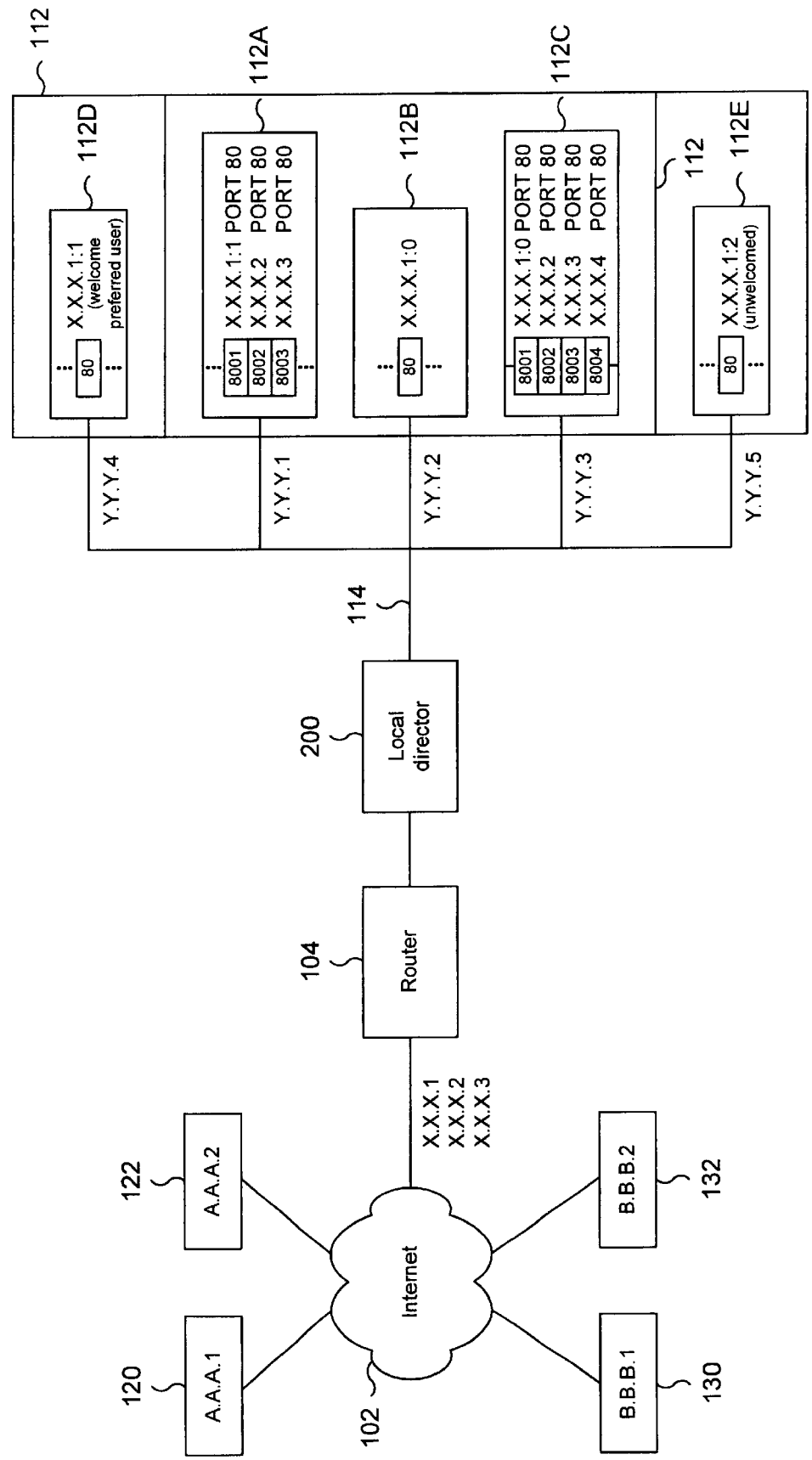
FIG. 1 is a block diagram illustrating a Local Director that distributes outside connections to a group of physical machines that implement several web sites.

FIG. 1 is a block diagram illustrating a Local Director® that distributes outside connections to a group of physical machines 112 (also referred to as real machines) that implement several web sites. Several Clients are shown which may connect to the websites that are implemented. A Client 120 has an IP address A.A.A.1 and a Client 122 belongs to the same subnet and has an IP address A.A.A.2. Also, a Client 130 has an IP address B.B.B.1 and a Client 132 that belongs to the same subnet has an IP address B.B.B.2. Clients make connections to virtual machines that have virtual IP addresses that are known to the Client. Each port of each virtual machine is bound to one or more real ports on a real machine. When a new connection is requested for a virtual machine port, then one of the real machine ports that is bound to the virtual machine port is selected to handle the connection. The selection is made using a load balancing scheme or other distribution scheme that distributes connections among all of the real ports that are bound to the virtual machine port specified in the incoming SYN packet.

Thus, the Local Director uses a group of physical to implement virtual machines that appear to the outside world to be handling connections. In addition, special instances of virtual machines having the same IP address may be defined that handle connections from certain source IP addresses and are bound to certain physical machines designated to handle those connections. Physical machine 112B is bound to a special instance of the virtual machine that corresponds to IP address X.X.X.1. The special instance of X.X.X.1 has a Bind ID of 0 and is denoted X.X.X.1:0. Similarly, physical machine 112D is bound to a special instance of the virtual machine with IP address X.X.X.1 that has a Bind ID of 1. This is denoted X.X.X.1:1. Also, physical machine 112E is bound to an instance of the virtual machine with a Bind ID of 2, denoted by X.X.X.1:2. Physical machine 122A has a port which is bound to X.X.X.1:1 and physical machine 112C has a port which is bound to X.X.X.1:0. The physical machines may also have other ports which are bound to other virtual IP addresses, as is shown.

Although the users at A.A.A.1, A.A.A.2, B.B.B.1, and B.B.B.2 each connect to a single virtual IP address, X.X.X.1, the different users at different source IP addresses are sent to different physical machines when they request a connection. That is because the different instances of the virtual machine have different Bind ID's and each Bind ID may service a different outside Client that has a different IP address.

In the example shown, X.X.X.1:1 is an instance of the virtual machine X.X.X.1 that is made available to preferred users. The physical machines assigned to the virtual machine may be faster, may have fewer Clients assigned to them so they tend to be less backlogged, or may simply have special processes running on them for preferred users. The physical machines are bound to the instance of the virtual machine object X.X.X.1 that is bound to Bind ID 1. Physical machine 112D includes a number of ports which are bound to various ports that may be specified in a SYN packet. Physical machine 112D handles connections for packets that include a destination IP address X.X.X.1 and a source IP address that corresponds to an IP address that is assigned to Bind ID 1. Physical machine 112A includes a port 8001 that receives connections with a destination port 80 and a destination address X.X.X.1 that come from a Client that is bound to Bind ID 1. Port 8001 may run a special process for preferred users connecting to port 80.

Similarly, physical machines 112B and 112C include ports which are bound to the instance of the virtual machine that corresponds to X.X.X.1 and Bind ID 0. Bind ID 0 is, in one embodiment, a special Bind ID that corresponds to any source IP address that is not assigned to any other Bind ID. Thus, Bind ID 0 could be assigned to the general public. A physical machine 112E has an IP address Y.Y.Y.5 and includes ports that are bound to an instance of a virtual machine object with IP address X.X.X.1 and Bind ID equal to 2. Bind ID 2 corresponds to Clients or users who for some reason are not welcome at the website. Thus, SYN packets with a source IP address that corresponds to such a Client are handled by virtual machine X.X.X.1 with a Bind ID 2 and are directed to physical machine 112E. Physical machine 112E runs special processes on its ports that either drop the connection or notify the user that the connection is unwelcome.

Thus, user 120 with IP address A.A.A.1 may be assigned to the instance of virtual machine X.X.X.1 with a Bind ID of 1 so that user 120 is treated as a preferred user and has access to certain physical machines such as 112D and 112A that are bound to X.X.X.1:1. Other users such as user 130 at IP address B.B.B.1 may be unwelcome users and may have their connection requests handled by a physical machine such as physical machine 112E which runs special process and is bound to the instance of virtual machine X.X.X.1 with a Bind ID of 2. Other users which are not specified and are not assigned to a specific Bind ID are serviced by physical machines 112B and 112C which are bound to the instance of virtual machine X.X.X.1 with a Bind ID of 0. The status of any particular user may be changed by simply assigning the IP address of the user to a different instance of virtual machine X.X.X.1.

Thus, all users ask for the same IP address, X.X.X.1, but they are treated differently based on the source IP address in the SYN packet that is sent to request a connection. The connection is assigned to a virtual machine with a Bind ID that corresponds to the initiator of the connection. A preferred user such as the user at IP address A.A.A.1 does not need to send packets to a special IP address in order to receive special treatment. The user need only connect to a standard IP address that may be published to all users including preferred users, general users, and even undesirable users. The preferred user's connection will be assigned to a special instance of a virtual machine that is bound to physical machines that run special processes for preferred users or provide superior response for preferred users. An undesired user such as the user at B.B.B.1, may know the same IP address that a preferred user knows, but when user B.B.B.1 attempts to connect to that address, the Local Director will assign the undesired user's connection to a different instance of virtual machine X.X.X.1 that is bound to a physical machine that runs a process for unwelcome users. Other users that are neither preferred or undesired have their connection assigned to an instance of a virtual machine that is bound to physical machines that service connections from such unclassified users.

It should be noted that in some embodiments, the instances of virtual machines that are assigned to preferred users may also be bound to physical machines which serve unclassified users as well. When this occurs, preferred users will have access to physical machines serving unclassified users when the physical machines serving preferred users are busy. In other embodiments, preferred users are only sent to physical machines that serve unclassified users when one or all of the physical machines serving preferred users has failed. Thus, the Local Director assigns incoming connections from a preferred user to a special instance of a virtual machine. The virtual machine may then either direct the connection to a special physical machine that services only the preferred user or to a general machine that services unclassified users when the special physical machine is busy or failed.

Figure 2:
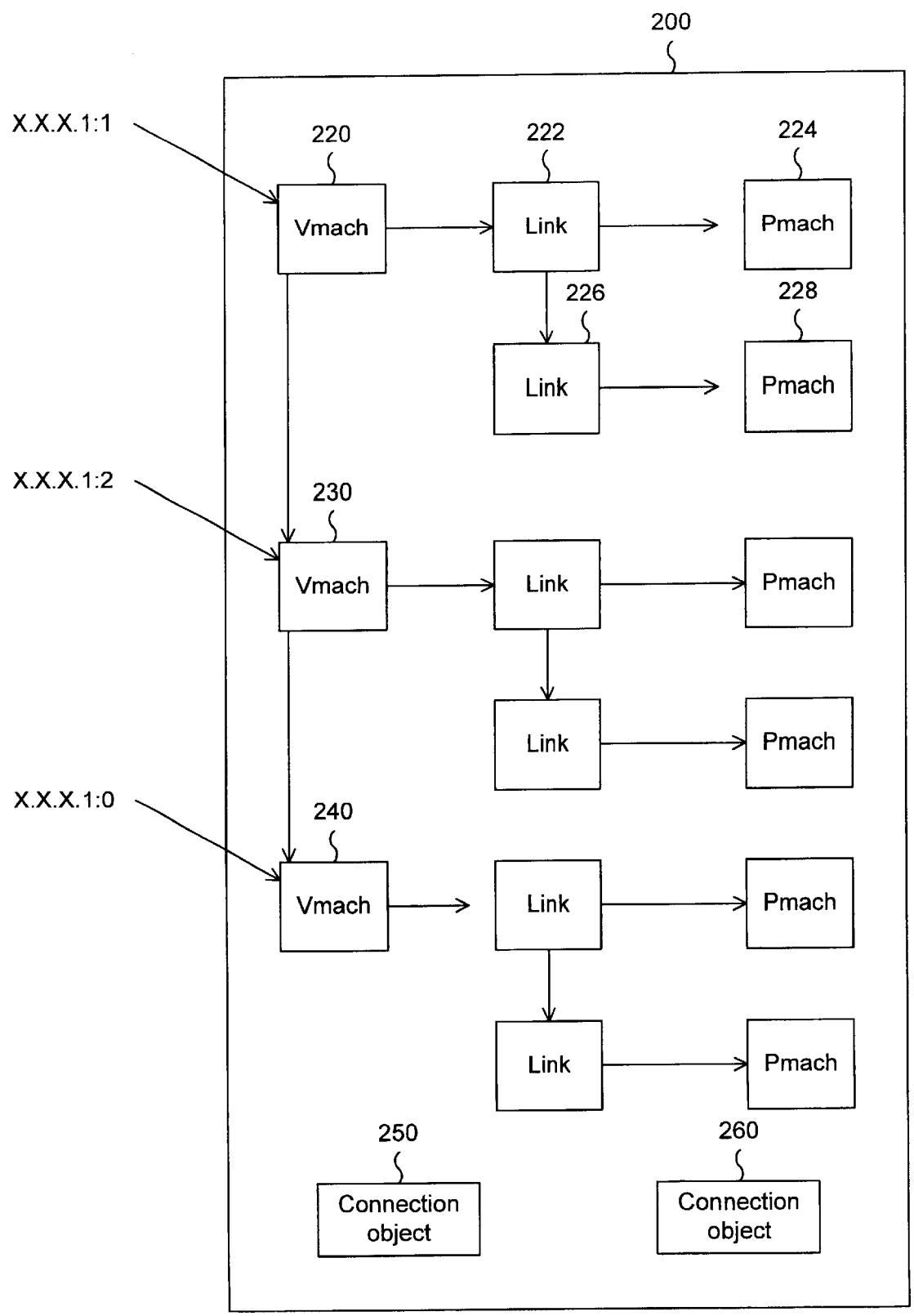
FIG. 2 is a block diagram illustrating an arrangement of data structures within a Local Director.

FIG. 2 is a block diagram illustrating an arrangement of data structures within a Local Director 200 that keeps track of the virtual machines implemented on Local Director 200 and the physical machines available to implement those virtual machines. The data structures are described in further detail in FIG. 3A through FIG. 3D. A first virtual machine object 220 stores information about a first virtual machine. Virtual machine object 220 includes an IP address for a virtual machine, a port number for the virtual machine, and a Bind ID, the purpose of which will be described below.

Virtual machine object 220 also points to a Link object 222 that points to a physical machine object 224. Link object 222 also points to another link object 226 that points to a physical machine object 228. Together, the virtual machine objects form a linked list that facilitates searching for the virtual machine which corresponds to a new connection request. Likewise, the link objects form a linked list that facilitates searching for a physical machine that is bound to a virtual machine to handle a new connection to the virtual machine. A connection object 250 and a connection object 260 contain pointers to the virtual machines and physical machines that correspond to the connections that they represent.

Each virtual machine object includes a Bind ID. Each of the virtual machine objects may have the same virtual IP address, but the virtual machine objects are distinguished by their Bind ID's and port numbers, if a port number is specified. In the example shown, the first instance of the virtual machine with IP address X.X.X.1 is represented by virtual machine object 220 with Bind ID 1. Virtual machine object 220 stores the Bind ID 1 which distinguishes virtual machine object 220 from the other virtual machine objects having the same virtual IP address. Virtual machine object 230 corresponds to a second instance of virtual machine X.X.X.1 with Bind ID 2. Virtual machine 240 contains the general Bind ID 0. Virtual machine 240 handles connections coming from source IP addresses that are not bound to virtual machine objects that include Bind ID 1 or 2. Once different Bind ID's are created for each of the virtual machine objects, it is possible to create Bind ID objects that point to different virtual machine objects that have the same IP address and port number but different Bind ID's. Thus, different instances of a virtual machine object for a virtual IP address are defined and each different instance of the virtual machine object has a different Bind ID.

Figure 3A:
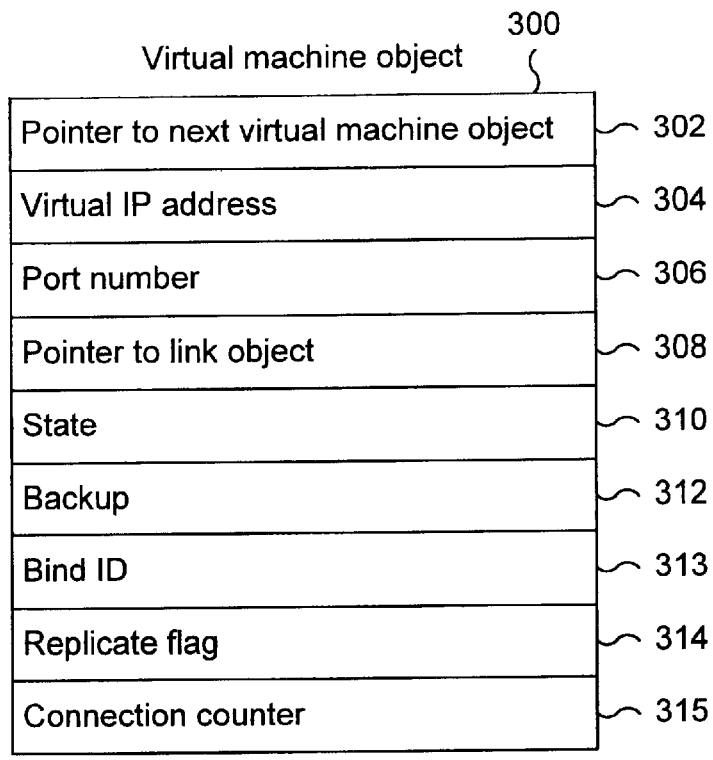
FIG. 3A is a block diagram illustrating the data structure of a virtual machine object.

FIG. 3A is a block diagram illustrating the data structure of a virtual machine object 300. Virtual machine object 300 includes a pointer 302 to the next virtual machine object to facilitate searching through the virtual machine objects. Virtual machine object 300 also includes a virtual machine IP address 304 which stores the IP address of one of the virtual machines that is being implemented by Local Director 300. A virtual port 306 specifies a virtual port on a virtual machine that the virtual machine object represents. A virtual machine object may represent all ports of a virtual machine or a specific port may be designated by the virtual machine object if the virtual machine object only represents a certain port. A pointer 308 to a link object facilitates searching for the physical machine object which has the best predicted response according to the chosen session distribution scheme. A state variable 310 stores the state of the virtual machine. A backup variable 312 stores a backup for the virtual machine. State variable 310 indicates the state of the virtual machine. Possible states include in service, out of service, or failed. A virtual machine is failed if all of the physical and virtual machines available to service it are failed.

A Bind ID field 313 stores a Bind ID for the virtual machine object. The Bind ID distinguishes different instances of a virtual machine object that include the same virtual IP address. A zero Bind ID indicates that the virtual machine object corresponds to a general virtual machine that is available for incoming SYN packets from foreign source IP addresses that have not been assigned to a particular virtual machine. A non-zero Bind ID indicates that the virtual machine object is assigned to or is available to be assigned to specific foreign source IP addresses that correspond to Clients that are handled in a special manner as described above.

A replicate flag 314 is used to indicate whether the virtual machine object is to be replicated on the failover connection manager. In one embodiment, a command is supplied that allows the system administrator to set the replicate flag independently for each virtual machine. Also, the virtual machine object includes a connection counter 315 used to count the number of connections to the virtual machine for the purpose of load balancing.

Figure 3B:
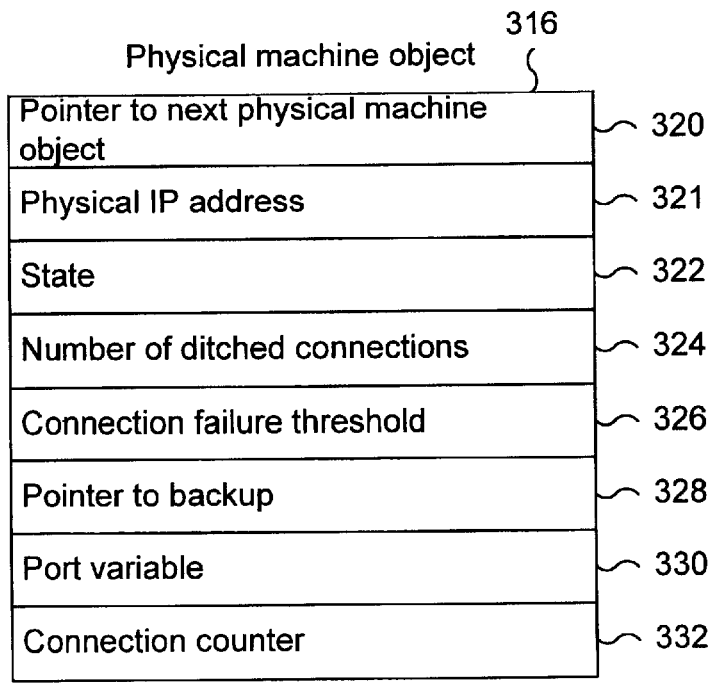
FIG. 3B is a block diagram illustrating the data structure of a physical machine object.

FIG. 3B is a block diagram illustrating the data structure of a physical machine object 316. Physical machine object 316 is used to store information related to a particular physical machine that is selected to serve connections to certain virtual machines. Physical machine object 316 contains a pointer 320 to the next physical machine object which facilitates searching among the physical machine objects. Physical machine object 316 also contains the real IP address 321 of the physical machine which it represents. A variable 322 stores the state (for example, in service or failed) of the physical machine and a variable 324 stores the number of ditched connections to the physical machine. Ditched connections are connections that are not successfully made after a number of resend of a SYN request. A variable 326 stores the connection failure threshold that determines the number of ditched connections required to fail the machine and a pointer 328 points to a backup machine. A port variable 330 stores a port number which indicates whether physical machine object 320 corresponds to an individual port on a machine. If port variable 330 is zero, then physical machine object 320 corresponds to all ports of a physical machine. Any other number is interpreted as a port number that the physical machine object represents. Also, the physical machine object includes a connection counter 332 used to count the number of connections to the virtual machine for the purpose of load balancing.

Figure 3C:
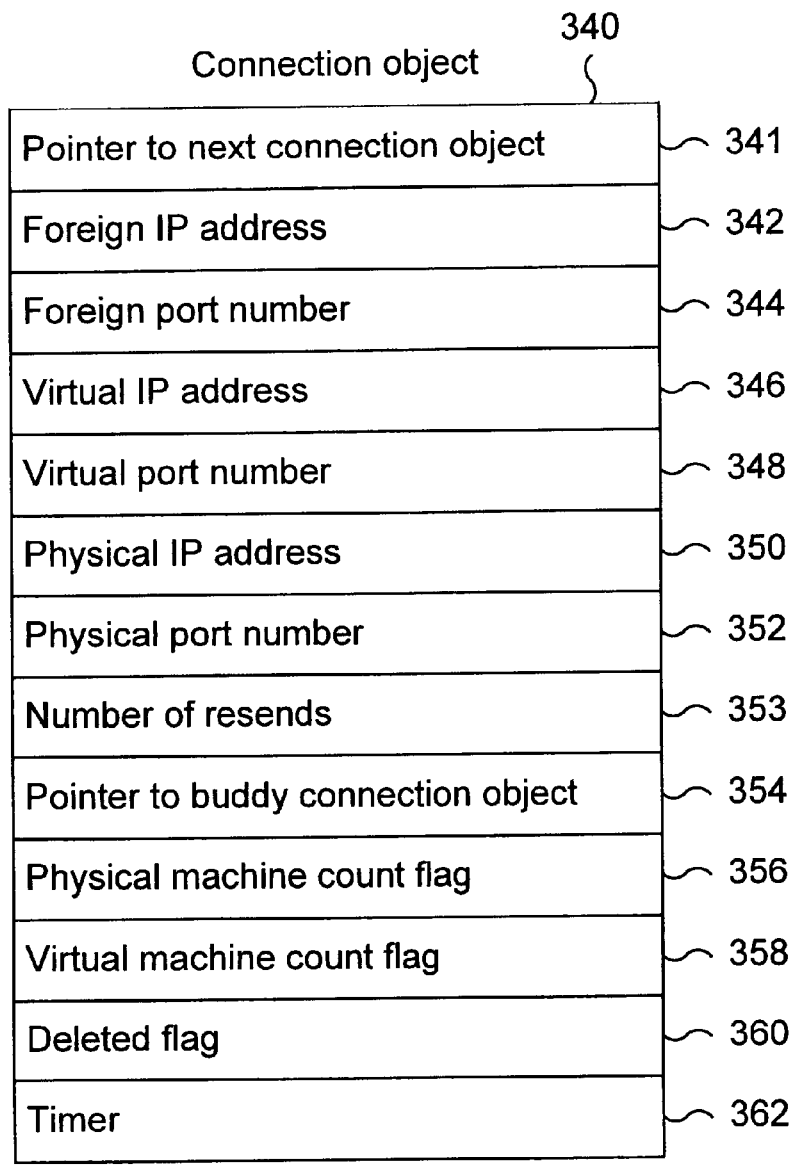
FIG. 3C is a block diagram illustrating a connection object data structure.

FIG. 3C is a block diagram illustrating a connection object data structure 340. Connection object 340 stores information related to individual connections made from a Client to one of the physical machines. Connection objects store the information necessary to ensure that packets transmitted from the Client to a virtual machine after a connection is established are routed to the physical machine for which the connection has been established. Connection object 340 includes a pointer 341 to the next connection object on its linked list hash chain. This pointer facilitates searching among the connection objects. In a preferred embodiment, the individual connection objects are stored in a hash chain to facilitate searching. Connection object 340 also includes the foreign IP address 342 and foreign port number 344 of the Client that is associated with the connection and the virtual machine IP address 346 and virtual machine port number 348 of the virtual machine that is being implemented for the connection. Connection object 321 also contains a physical IP address 350 of the physical machine to which the connection is assigned. A physical machine port number 352 is also included in the connection object. Variable 353 stores the number of times that a SYN packet has been resent to a physical machine to establish a connection.

A pointer 354 to a buddy connection object is also included so that associated connections can be linked for various purposes. For example, an FTP session may open up both a data and a control connection. Once a file is requested over the control connection, it may take a considerable amount of time to transfer the file over the data connection. In such a case, the control connection should not be timed out because there is no activity on the control connection since it is waiting for the data transfer to complete and has not been dropped by the other side. The activity on the data connection should prevent the control connection from being dropped. This is accomplished by designating the control and data connections as buddy connections and checking for activity on one before the other is timed out and deleted. As long as one of the buddy connections is still active, both connections are not deleted.

Connection object 340 also includes a physical machine count flag 356 and a virtual machine count flag 358. These flags are used to indicated that the connection has been counted for load balancing purposes by the physical machine object and the virtual machine object that correspond to the connection. A 0 indicates that the connection has not been counted and causes a process that updates the physical machine object and the virtual machine object counters to increment those counters when the connection object is checked. The flag states are then changed to 1. The connection object also includes a flag 360 that indicates when the connection object has been deleted. Other state flags 364 are also included in the connection object. The other state flags track the state of the connection, including whether the connection is active. The state flags also include details about the TCP state of the connection in certain embodiments.

A timer 362 is used to record a time at which activity occurred on the connection, such as the receiving of a packet. In one embodiment, connections are timed out periodically and deleted when the recorded time in timer 362 differs from the current time by more than a determined amount. As noted above, deletion of the connection object may be avoided if a buddy connection exists that has not been timed out.

Using the data structures shown in FIGS. 3A through 3C, Local Director 300 is able to provide the necessary IP addresses, port numbers, and pointers to establish a connection and define a connection object. The connection object contains all the information necessary to change the destination IP address and port number of incoming packets to the IP address and port number of a physical machine that is implementing a virtual machine. Likewise, the connection object contains all the information necessary to change the source IP address and port number of outgoing packets to the IP address and port number of a physical machine that is implementing a virtual machine. The connection object also keeps track of the number of resends of a SYN packet to establish a connection. Connections can be ditched after a certain number of resends and a new physical machine assigned to the connection. A physical machine object tracks the number of ditched connections for each physical machine and Local Director 300 uses this information to fail machines that ditch too many consecutive connections. Each physical machine object also contains a pointer to a backup physical machine so that if the physical machine fails, a backup can be made available.

Figure 3D:
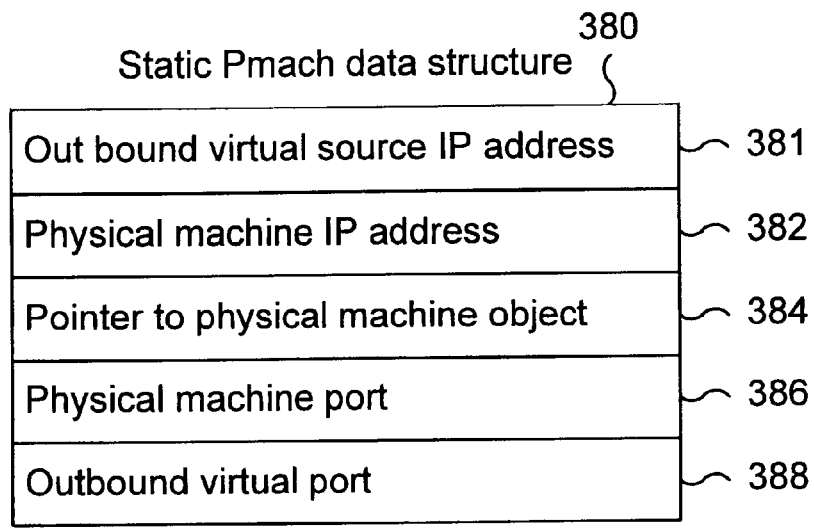
FIG. 3D is a block diagram illustrating a static physical machine object.

FIG. 3D is a block diagram illustrating a static physical machine object 380. Static physical machine object 380 includes an outbound virtual source address 381. The outbound virtual source address is the IP address that is used to replace the real machine IP address an outbound packets corresponding to connections initiated by the real machine. A physical machine IP address 382 is the actual IP address of the real machine that is being virtualized. A pointer to a physical machine object 384 is included when the real machine that is being virtualized is also available to the Local Director for the purpose of handling remotely initiated connections. The pointer to the physical machine object is used by the Local Director to update the number of connections in the physical machine object so that virtualized connections initiated by the real machine may be counted for the purpose of load balancing.

In some embodiments, the static physical machine object may also include a physical machine port 386 and an outbound virtual port 388. The physical machine port may be optionally specified and is used to affect load balancing. If a port is given, then the physical machine IP address and port must match a physical machine that is defined on the Local Director as being available to implement a virtual machine. Outbound connections that correspond to the static physical machine object are considered when load balancing incoming connections to the physical machine. The outbound virtual port is used to translate the source port number of packets for a physical machine that is virtualized in embodiments where the physical machine port is translated.

It should be noted the that physical machine port and outbound virtual port variables in the static physical machine object are optionally included in certain embodiments. Generally, it is possible to translate only the IP address of packets from virtualized real machines. It is also possible to translate the port numbers, if that is desired. Likewise, it is also possible to translate packets for all ports of a virtualized physical machine or to only translate packets from certain ports of the physical machine. In this specification, it should be noted that when translation of a physical machine IP address is described, ports from that physical machine may also be translated. Also, when a physical machine IP address is specified, a physical machine port may also be specified.

Figure 4:
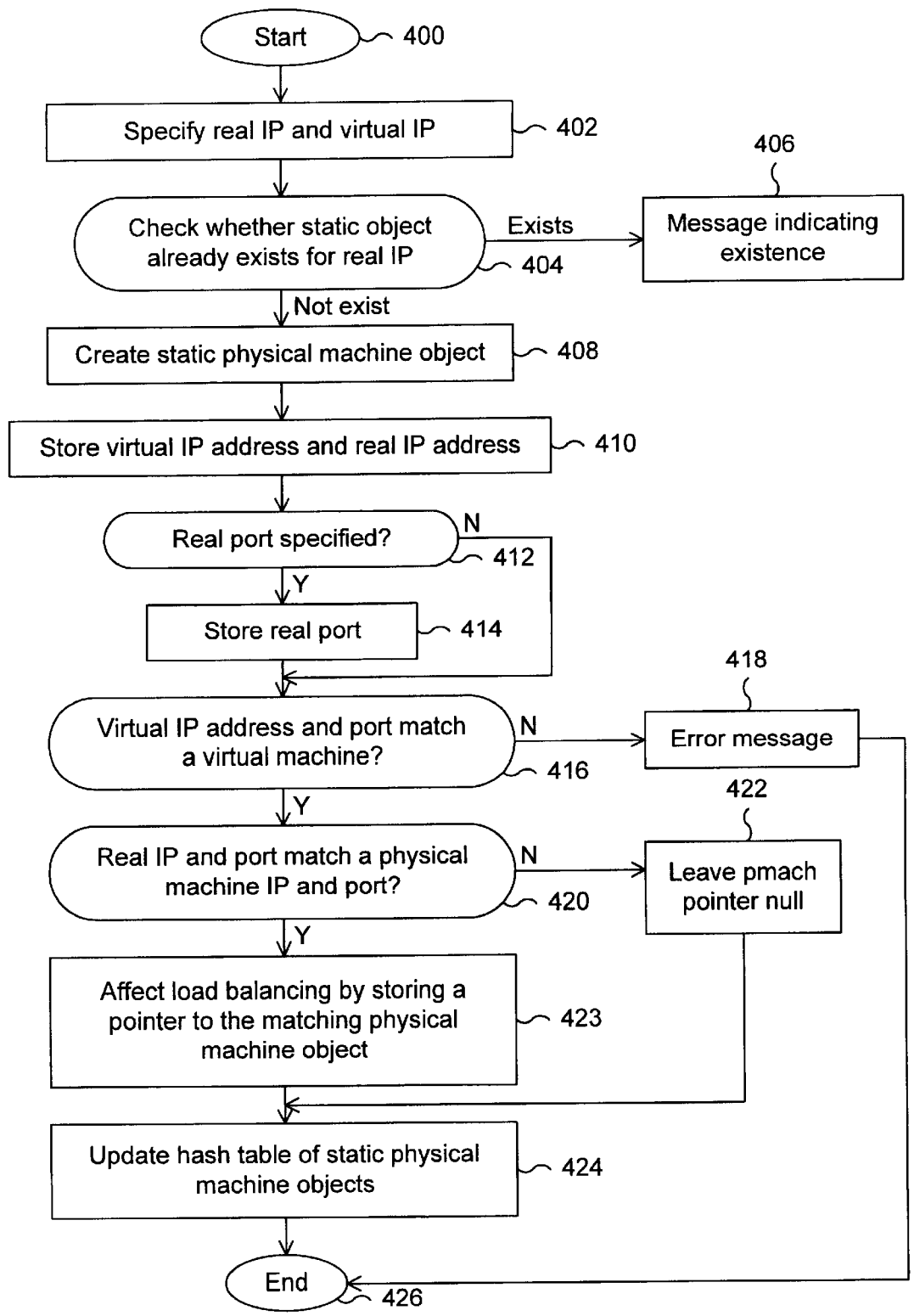
FIG. 4 is a flow chart illustrating a process for creating a static physical machine object.

FIG. 4 is a flow chart illustrating a process for creating a static physical machine object. The process starts at 400. In a step 402. the real IP of a physical machine that is to be virtualized is specified and the virtual IP address that is to be used is specified. Next in step 404, the Local Director checks whether a static object already exists for the real IP address specified in step 402. If a static object already exists, control is transferred to a step 406 and a message indicating the existence of the static object is generated. If the static object does not exist, then control is transferred to a step 408 and a new static physical machine object is created.

Next, in a step 410, the virtual IP address specified in step 402 is stored in the static physical machine object. Then, in a step 412, it is checked whether a real port is specified for the virtualized real machine. If a real port is specified, then control is transferred to a step 414 and the real port is stored in the static physical machine object. If no real port is specified, then control is transferred directly to step 416. In step 416, it is determined whether the virtual IP address and port specified match a virtual machine. If they do not, then an error message is returned in step 418 and the process ends at 426. If a match is determined, then control is transferred to a step 420 where it is determined whether the real IP address and port number match a real IP address and port of a physical machine object. If there is no match, then the pmach pointer in the static connection object is left null in a step 422 and control is transferred to a step 424 where the static physical machine object hash table is updated. If a match is determined in step 420, then control is transferred to a step 423 and a pointer to the matching physical machine object is stored in the static physical machine object. Control is then transferred to step 424 and the static physical machine object hash table is updated. The process ends at 426.

Thus, the user specifies all the information needed to virtualize locally initiated connections. In one embodiment, a static command shown below is used to specify the information:

Static<real IP>[real port]<virtual IP>[:virtual port:[bind id]]

The static command requires that a real IP address and a virtual IP address be specified. A real port may also be specified in situations where the outbound connections assigned using the static physical machine object are load balanced along with inbound connections.

Figure 5:
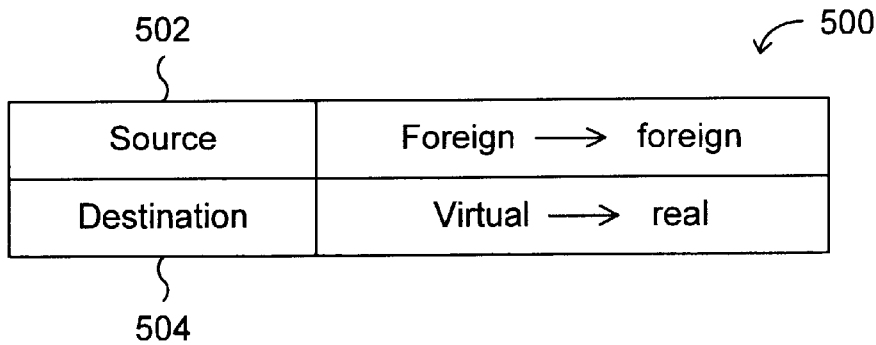
FIG. 5 is a block diagram illustrating how the source and destination IP addresses and port numbers for a remotely generated packet and a locally generated packets are translated.
Figure 5:
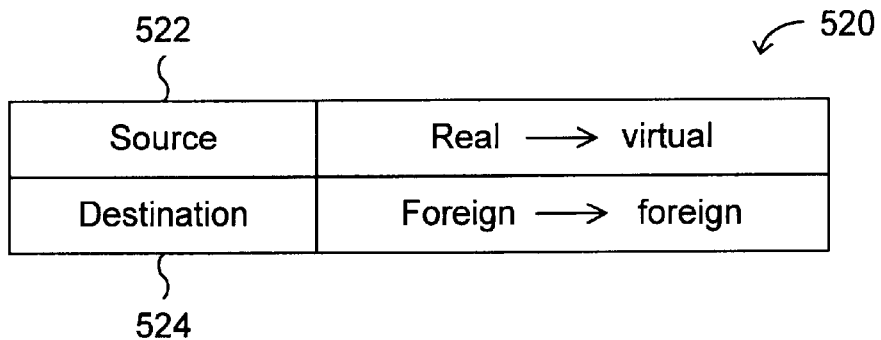

FIG. 5 is a block diagram illustrating how the source and destination IP addresses and port numbers, if applicable, for a remotely generated packet and a locally generated packets are translated. A remotely generated packet 500 has a source IP address that is a foreign IP address. That IP address is not translated. A remotely generated packet has a destination IP address that is a virtual IP address and it is translated into a real IP address in a manner specified by a connection object.

A locally generated packet 520 is also shown. Locally generated packet 520 includes a source IP address 522. Source IP address 522 has a real machine IP address that is translated to a virtual IP address by the Local Director. Locally generated packet 520 may correspond to a remotely initiated connection in which case the source IP address translation will be controlled by a connection object generated when the remotely initiated connection was assigned to the physical machine. The connection object is found by matching the packet destination IP addresses and port number to a connection object. If the locally generated packet corresponds to a locally initiated connection, then the virtual IP address that is used for translating the source IP address is specified in a static physical machine object. The static physical machine object is used to generate a connection object that is used to translate packets. A destination IP address 524 corresponds to a foreign IP address and is not translated for locally generated packets.

Figure 6:
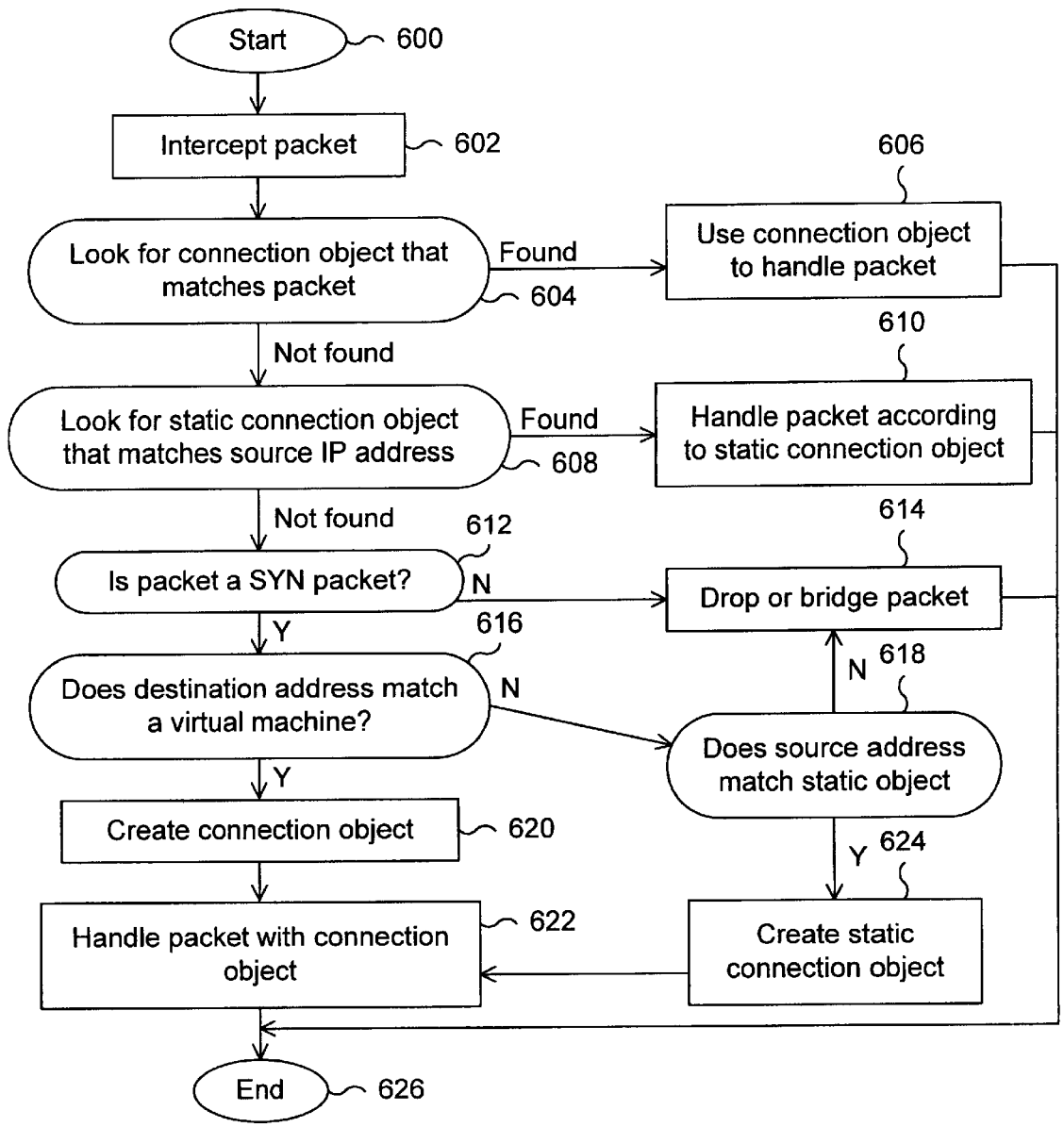
FIG. 6 is a flow chart illustrating a process implemented on the Local Director for handling packets.

FIG. 6 is a flow chart illustrating a process implemented on the Local Director for handling packets. The process starts at 600. In a step 602, a packet is intercepted. Next, in a step 604, a search is made for a connection object that matches the packet. A connection object matches the packet if the packet contains a source and destination IP address and port number that matches the source and destination IP address and port number of a connection object. If a connection object is found, then control is transferred to a step 606 and the connection object is used to translate the packet. The process then ends at 626.

If a connection object is not found to handle the intercepted packet, then control is transferred to a step 608. In step 608, a search is made for a static connection object that matches the source IP address of the packet. If a static connection object is found, then control is transferred to a step 610 and the packet is handled using the static connection object. Step 610 is further described in FIG. 8. The process then ends at 626. It should be noted that in some embodiments, the connection object and the static connection object have exactly the same data structure as shown in FIG. 3C. The connection objects and the static connection objects may all be stored in the same hash table and may all be searched together in such embodiments. It is also possible, in other embodiments, to have the static connection objects and connection objects stored in separate hash tables and to have them searched sequentially as shown above.

If no static connection object is found for the packet, then control is transferred to a step 612 and it is checked whether the packet is a SYN packet. If the packet is not a SYN packet, then control is transferred to a step 614 and the packet is either dropped or bridged according to the configuration of the Local Director and the process ends at 626. If the packet is a SYN packet, then control is transferred to step 616. If the packet is a SYN packet, then it may correspond to a new connection and the Local Director checks whether or not a new connection object should be created. In step 616, it is checked whether the destination address of the packet matches a virtual machine. If the destination address matches a virtual machine, then control is transferred to a step 620 and a connection object is created. The packet is then handled using that connection object in a step 622 and the process ends at 626.

If the destination address does not match a virtual machine, then the Local Director must also check whether the source address matches a static physical machine object. Again, it should be noted that, in certain embodiments, both the source IP address and the port may be checked for a match to a static physical machine object. If the source IP address matches a static physical machine object, then control is transferred to a step 624 and a static connection object is created. Step 624 is further described in FIG. 7. Control is then transferred to step 622 and the packet is handled using the connection object and the process ends at 626. If the source IP address does not match a static object in step 618, then control is transferred to step 614. In step 634, the packet is dropped or bridged and the process ends at 626.

Figure 7:
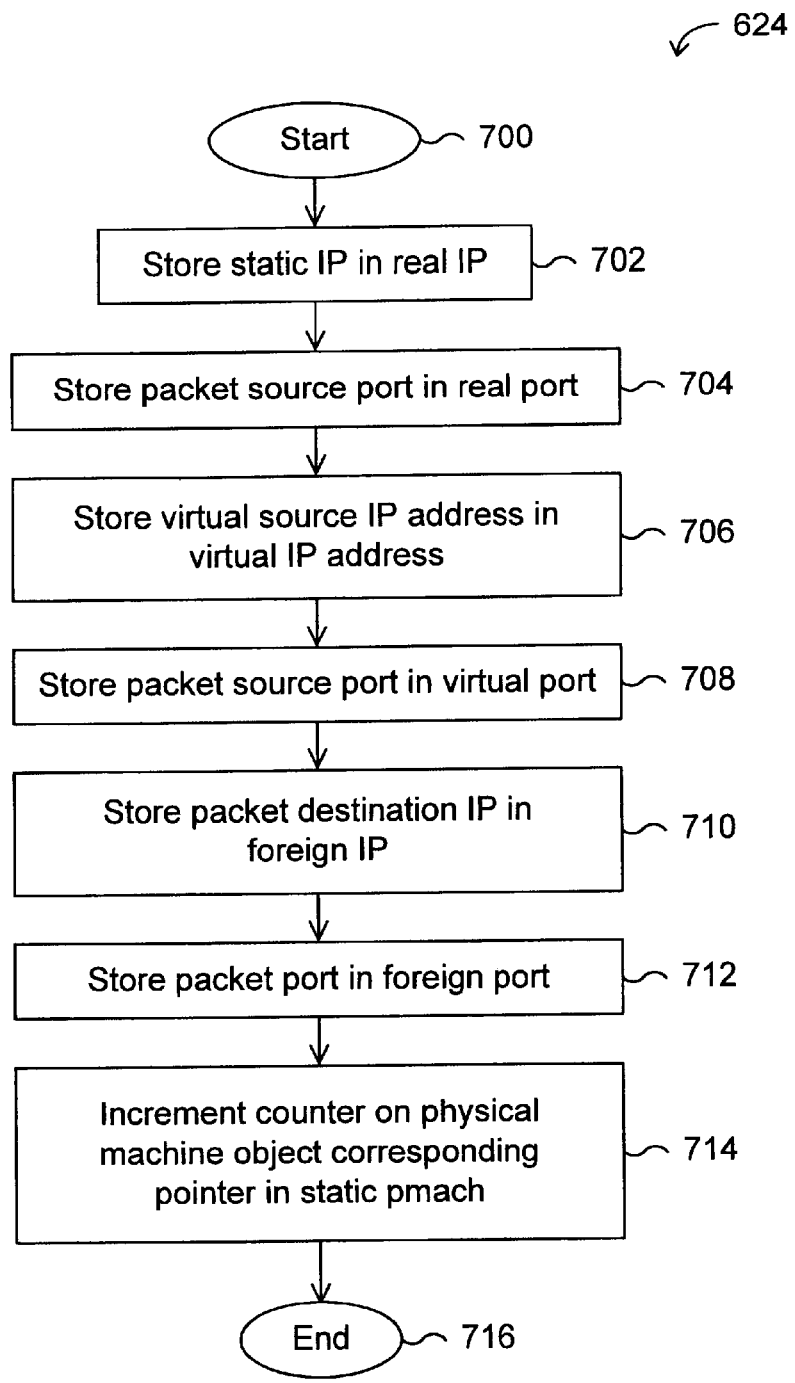
FIG. 7 is a flow chart illustrating creating a static connection object.

FIG. 7 is a flow chart illustrating creating a static connection object as shown in step 624 of FIG. 6. The process starts at 700. In a step 702, the static IP address that is specified as the source IP address of the packet is stored in the real IP address. In a step 704, the packet source port is stored in the real port. In step a 706, the virtual source IP address from the static physical machine object is stored in the virtual IP address and in step 708 the packet source port is stored in the virtual port. In certain embodiments, a virtual port may be specified in the static physical machine object and the virtual port may be stored in the virtual port of the static connection object.

In step 710, the packet destination IP address is stored in the foreign IP address of the connection object. In a step 712, the packet port number is stored in the foreign port of the connection object. Finally, the counter on the physical machine object that corresponds to the pointer in the static physical machine object is incremented in a step 714. Thus, when the connection is created for a locally initiated connection, the pointer in the static physical machine object is used to locate the physical machine object used by the Local Director to allocate connections among the physical machines available to it. That counter is incremented so that the locally initiated connection is considered when determining whether or not to send connections to that physical machine. The process then ends at 716.

Figure 8:
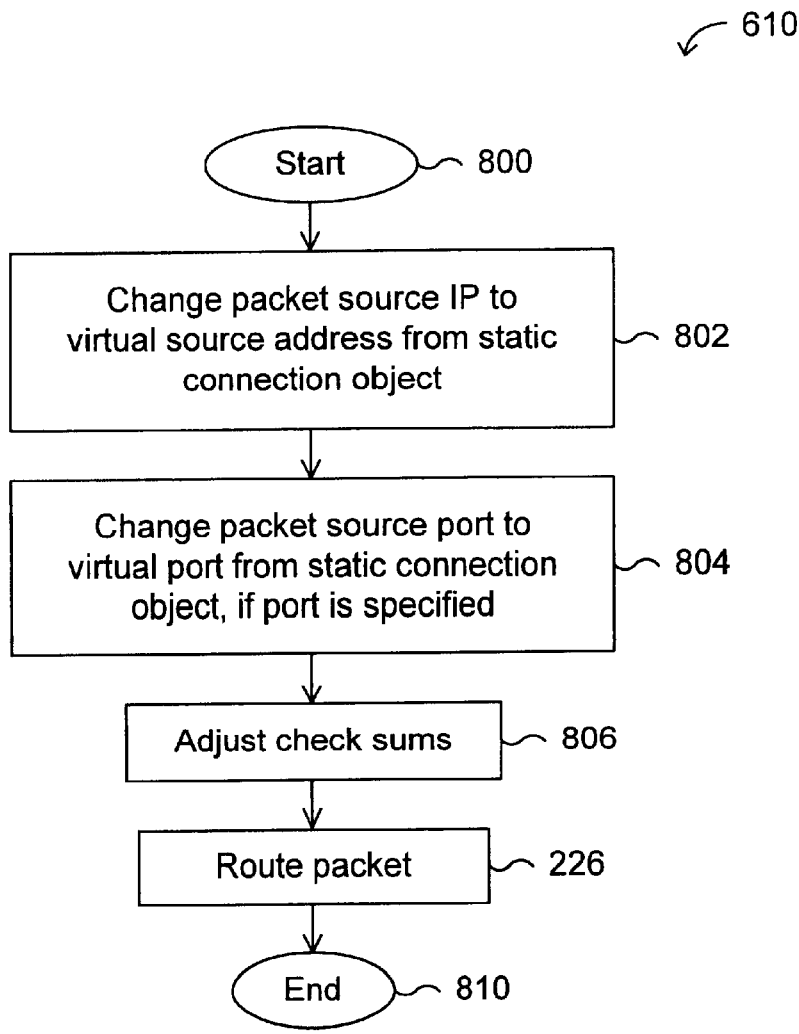
FIG. 8 is a block diagram illustrating the process for handling a packet using a static connection object.

FIG. 8 is a block diagram illustrating the process for handling a packet using a static connection object as shown in step 610 of FIG. 6. The process starts at 800. In a step 802, the packet source IP address is changed to the virtual source IP address from the static connection object. Next, in a step 804, the packet source port is changed to the virtual port from the virtual static connection object if a virtual port is specified in the static connection object. Next, in a step 806, the check sums are adjusted for the packets. In a step 808, the packet is routed and the process ends at 810.

Figure 9:
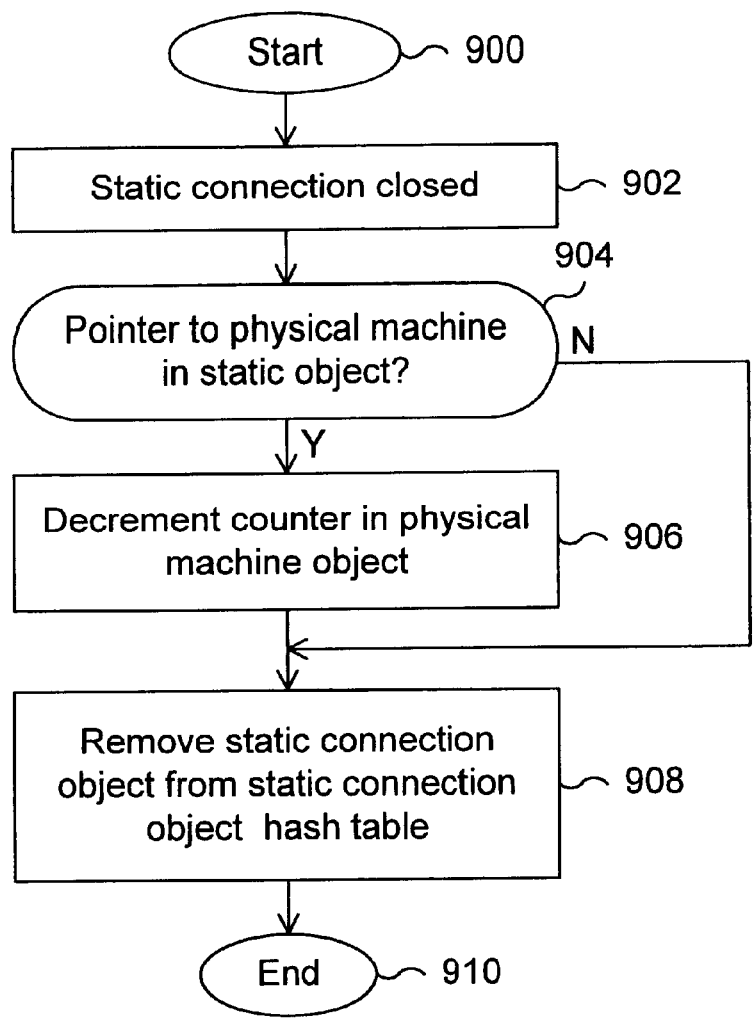
FIG. 9 is a flow chart illustrating a process for closing a connection and deleting a static connection object.

FIG. 9 is a flow chart illustrating a process for closing a connection and deleting a static connection object. The process starts at 900. In a step 902, the static connection is closed. Next, in a step 904, it is checked whether the static object that corresponds to the connection contains a pointer to a physical machine object. If the static physical machine object contains a pointer to a physical machine object, then control is transferred to a step 906 and the counter in the physical machine object is decremented to reflect the fact that the connection has been closed and there is one less connection to the physical machine that should be considered for the purpose of load balancing. If there is not pointer to a physical machine in the static physical machine object, then control is transferred directly to step 908 and the static connection object is removed from the static connection object hash table. It should be noted that the static connection object hash table may be a common connection object hash table that includes both locally and remotely initiated connections as described above. Alternatively, separate hash tables may be used for static connections objects and for connection objects corresponding to remotely initiated connections. The process then ends at 910.

Thus, a method of specifying physical machines that are to have connections initiated by them virtualized has been described. New locally initiated connections are checked to determine whether they correspond to a virtualized static physical machine object. When such connections are found, the connection objects are created so that further packets sent on the connection may be intercepted and translated. A pointer to a physical machine object used for the purpose of assigning remotely initiated connections is provided so that locally initiated connections may be considered in load balancing new incoming remotely initiated connections.

Figure 10:
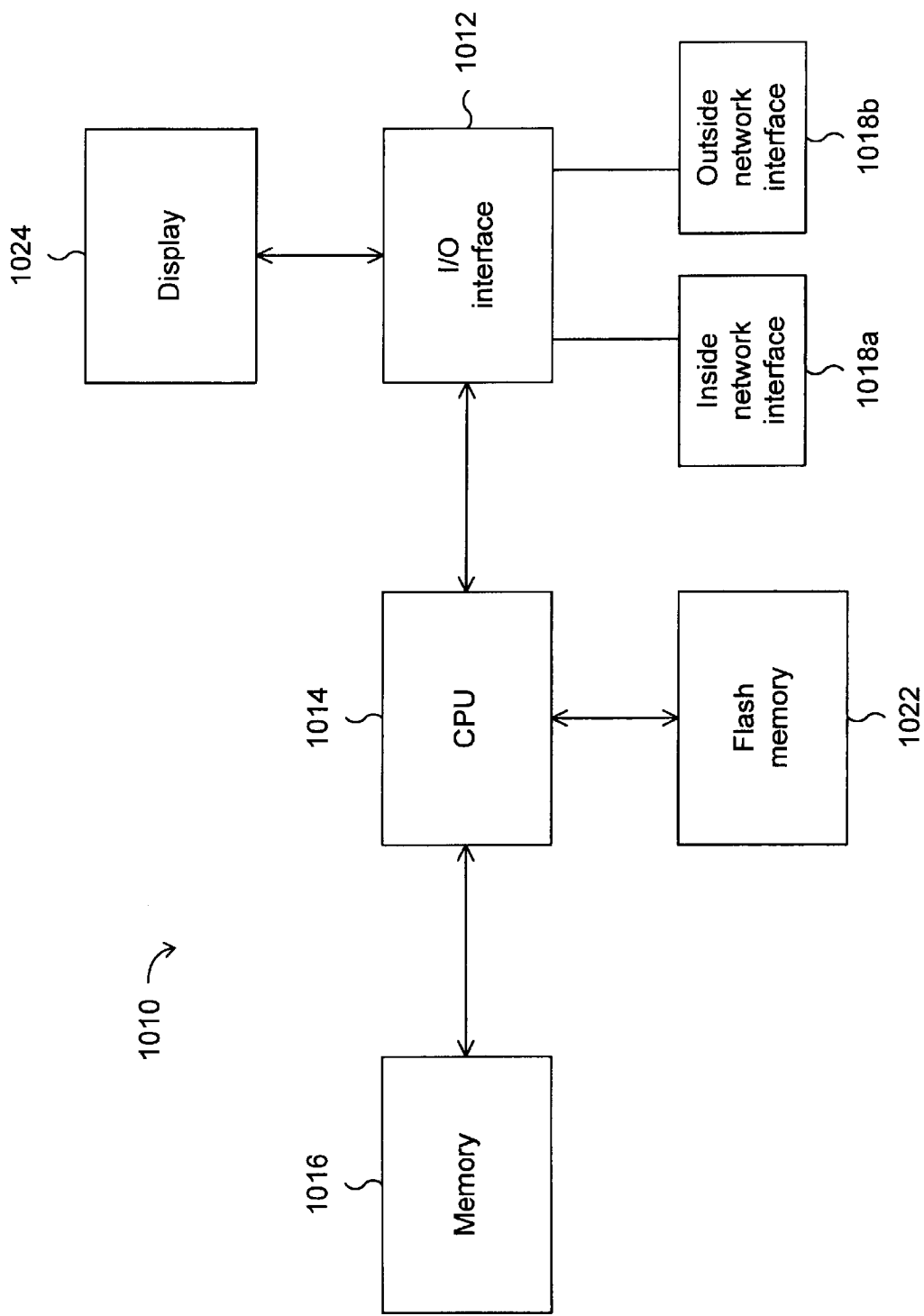
FIG. 10 illustrates a typical computer-based system which may be used as a Local Director of the present invention.

FIG. 10 illustrates a typical computer-based system which may be used as a Local Director of the present invention. Shown is a computer 1010 which comprises an input/output interface 1012 used to communicate information in appropriately structured form to and from the parts of computer 1010 and associated equipment, a central processing unit 1014, and a memory 1016. These components are those typically found in most general and special purpose computers 1010 and are intended to be representative of this broad category of data processors.

Connected to the input/output circuit 1012 are inside and outside high speed Local Area Network interfaces 1018a and 1018b. The inside interface 1018a is connected to a private network, while the outside interface 1018b is be connected to an external network such as the Internet. Preferably, each of these interfaces includes (1) a plurality of ports appropriate for communication with the appropriate media, (2) associated logic, and in some instances (3) memory. The associated logic may control such communications intensive tasks as packet integrity checking and media control and management. The high speed interfaces 1018a and 1018b are preferably multiport Ethernet interfaces, but may be other appropriate interfaces such as FDDI interfaces, etc.

The computer system may also include an input device (not shown) such as a keyboard. A flash memory device 1022 is coupled to the input/output circuit 1012 and provides additional storage capability for the computer 1010. The flash memory device 1022 may be used to store programs, data and the like and may be replaced with a magnetic storage medium or some other well known device. It will be appreciated that the information retained within the flash memory device 1022, may, in appropriate cases, be incorporated in standard fashion into computer 1010 as part of the memory 1016.

In addition, a display monitor 1024 is illustrated which is used to display output messages or images generated by the present invention. Such a display monitor 24 may take the form of any of several well-known varieties of cathode ray tube displays and flat panel displays or some other type of display.

Although the system shown in FIG. 10 is a preferred computer system of the present invention, the displayed computer architecture is by no means the only architecture on which the present invention can be implemented. For example, other types of interfaces and media could also be used with the computer.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, whenever a variable is described as being stored in an object, the variable could equivalently be stored in a different data structure and a pointer to the data structure could be provided in the object. Accordingly, the present embodiments are to be considered as illustrative and not restrictive, and the invention is not to be limited to the details given herein, but may be modified within the scope and equivalents of the appended claims.

What is claimed is:

1. A method of virtualizing a locally initiated outbound connection from a physical machine used to implement a virtual machine comprising:

providing a virtual machine object having a virtual IP address that corresponds to the virtual machine wherein inbound connections directed to the virtual machine are handled by the physical machine having a physical machine IP address;

providing a static physical machine object wherein the static physical machine object contains the virtual IP address and the physical machine IP address;

intercepting a SYN packet for an outbound connection having a SYN packet source IP address that corresponds to the physical machine IP address and a packet destination address that corresponds to a foreign IP address;

determining that the packet source IP address matches the physical machine IP address; and creating a connection object for handling outbound connections from the physical machine IP address.

2. A method of virtualizing a locally initiated outbound connection from a physical machine as recited in claim 1 wherein the connection object includes the virtual IP address and the physical IP address.

3. A method of virtualizing a locally initiated outbound connection from a physical machine as recited in claim 2 wherein the connection object includes a virtual port number and a physical port number.

4. A method of virtualizing a locally initiated outbound connection from a physical machine as recited in claim 2 further including intercepting a data packet having a data packet source IP address that matches the physical IP address and translating the data packet source IP address to the virtual IP address.

5. A method of virtualizing a locally initiated outbound connection from a physical machine as recited in claim 1 wherein the static physical machine object contains a pointer to a physical machine object.

6. A method of virtualizing a locally initiated outbound connection from a physical machine as recited in claim 5 wherein providing a static physical machine object further includes specifying a physical machine port and searching among a plurality of physical machine objects for a matching physical machine object that matches the physical machine IP address and the physical machine port.

7. A method of virtualizing a locally initiated outbound connection from a physical machine as recited in claim 6 further including storing a pointer to the matching physical machine object in the static physical machine object.

8. A method of virtualizing a locally initiated outbound connection from a physical machine as recited in claim 7 wherein the pointer to the matching physical machine object is used to increment a connection counter in the physical machine object when the connection object is created.

9. A method of virtualizing a locally initiated outbound connection from a physical machine as recited in claim 8 wherein the connection counter also counts inbound connections made to the physical machine.

10. A method of virtualizing a locally initiated outbound connection from a physical machine as recited in claim 6 wherein the matching physical machine object is used to load balance inbound connections from a foreign IP address.

11. A method of virtualizing a locally initiated outbound connection from a physical machine as recited in claim 5 wherein the physical machine object includes a counter that keeps track of the number of connections made to the physical machine object.

12. A method of virtualizing a locally initiated outbound connection from a physical machine as recited in claim 11 wherein the number of connections made to the physical machine object include inbound connections to the virtual machine handled by the physical machine.

13. A method of virtualizing a locally initiated outbound connection from a physical machine as recited in claim 12 further including incrementing the counter when the connection object for handling outbound connections from the physical machine IP address is created.

14. A method of virtualizing a locally initiated outbound connection from a physical machine as recited in claim 1 wherein the outbound connection from the physical machine is counted along with inbound connections made to the physical machine for the purpose of load balancing new incoming connections.

15. A connection manager for distributing remotely initiated connections to a virtual machine using a physical machine and virtualizing locally initiated connections from the physical machine comprising:
- a virtual machine object having a virtual IP address that corresponds to the virtual machine wherein inbound connections directed to the virtual machine are handled by the physical machine having a physical machine IP address;
- a static physical machine object wherein the static physical machine object contains the virtual IP address and the physical machine IP address;
- a packet interceptor that is operative to intercept a SYN packet for an outbound connection having a SYN packet source IP address that corresponds to the physical machine IP address and a packet destination address that corresponds to a foreign IP address; and
- a connection object that includes the virtual IP address and the physical IP address that is used to handle outbound connections from the physical machine IP address.

16. A connection manager for distributing remotely initiated connections to a virtual machine using a physical machine and virtualizing locally initiated connections from the physical machine as recited in claim 15 further including a physical machine object and wherein the static physical machine object contains a pointer to a physical machine object.

17. A connection manager for distributing remotely initiated connections to a virtual machine using a physical machine and virtualizing locally initiated connections from the physical machine as recited in claim 16 wherein the pointer to the physical machine object is used to increment a connection counter in the physical machine object when the connection object is created.

18. A computer program product for virtualizing a locally initiated outbound connection from a physical machine used to implement a virtual machine, the computer program product being embodied in a computer readable medium and comprising computer instructions for:
- providing a virtual machine object having a virtual IP address that corresponds to the virtual machine wherein inbound connections directed to the virtual machine are handled by the physical machine having a physical machine IP address;
- providing a static physical machine object wherein the static physical machine object contains the virtual IP address and the physical machine IP address;
- intercepting a SYN packet for an outbound connection having a SYN packet source IP address that corresponds to the physical machine IP address and a packet destination address that corresponds to a foreign IP address;
- determining that the packet source IP address matches the physical machine IP address; and
- creating a connection object for handling outbound connections from the physical machine IP address.

19. A computer program product for virtualizing a locally initiated outbound connection from a physical machine used to implement a virtual machine as recited in claim 18 wherein the connection object includes the virtual IP address and the physical IP address.

20. A computer program product for virtualizing a locally initiated outbound connection from a physical machine used to implement a virtual machine as recited in claim 19 wherein the connection object includes a virtual port number and a physical port number.

21. A computer program product for virtualizing a locally initiated outbound connection from a physical machine used to implement a virtual machine as recited in claim 19, further comprising computer instructions for intercepting a data packet having a data packet source IP address that matches the physical IP address and translating the data packet source IP address to the virtual IP address.

22. A computer program product for virtualizing a locally initiated outbound connection from a physical machine used to implement a virtual machine as recited in claim 18 wherein the static physical machine object contains a pointer to a physical machine object.

23. A computer program product for virtualizing a locally initiated outbound connection from a physical machine used to implement a virtual machine as recited in claim 22 wherein providing a static physical machine object further includes specifying a physical machine port and searching among a plurality of physical machine objects for a matching physical machine object that matches the physical machine IP address and the physical machine port.

24. A computer program product for virtualizing a locally initiated outbound connection from a physical machine used to implement a virtual machine as recited in claim 23, further comprising computer instructions for storing a pointer to the matching physical machine object in the static physical machine object.

25. A computer program product for virtualizing a locally initiated outbound connection from a physical machine used to implement a virtual machine as recited in claim 24 wherein the pointer to the matching physical machine object is used to increment a connection counter in the physical machine object when the connection object is created.

26. A computer program product for virtualizing a locally initiated outbound connection from a physical machine used to implement a virtual machine as recited in claim 25 wherein the connection counter also counts inbound connections made to the physical machine.

27. A computer program product for virtualizing a locally initiated outbound connection from a physical machine used to implement a virtual machine as recited in claim 23 wherein the matching physical machine object is used to load balance inbound connections from a foreign IP address.

28. A computer program product for virtualizing a locally initiated outbound connection from a physical machine used to implement a virtual machine as recited in claim 22 wherein the physical machine object includes a counter that keeps track of the number of connections made to the physical machine object.

29. A computer program product for virtualizing a locally initiated outbound connection from a physical machine used to implement a virtual machine as recited in claim 28 wherein the number of connections made to the physical machine object include inbound connections to the virtual machine handled by the physical machine.

30. A computer program product for virtualizing a locally initiated outbound connection from a physical machine used to implement a virtual machine as recited in claim 29 further comprising computer instructions for incrementing the counter when the connection object for handling outbound connections from the physical machine IP address is created.

31. A computer program product for virtualizing a locally initiated outbound connection from a physical machine used to implement a virtual machine as recited in claim 18 wherein the outbound connection from the physical machine is counted along with inbound connections made to the physical machine for the purpose of load balancing new incoming connections.

32. A system for virtualizing a locally initiated outbound connection from a physical machine used to implement a virtual machine, comprising:
    a processor; and
    computer memory accessible by the processor and configured to store computer code executable by the processor, the computer code comprising computer instructions for:
        providing a virtual machine object having a virtual IP address that corresponds to the virtual machine wherein inbound connections directed to the virtual machine are handled by the physical machine having a physical machine IP address;
        providing a static physical machine object wherein the static physical machine object contains the virtual IP address and the physical machine IP address;
        intercepting a SYN packet for an outbound connection having a SYN packet source IP address that corresponds to the physical machine IP address and a packet destination address that corresponds to a foreign IP address;
        determining that the packet source IP address matches the physical machine IP address; and
        creating a connection object for handling outbound connections from the physical machine IP address.

33. A system for virtualizing a locally initiated outbound connection from a physical machine used to implement a virtual machine as recited in claim 32 wherein the connection object includes the virtual IP address and the physical IP address.

34. A system for virtualizing a locally initiated outbound connection from a physical machine used to implement a virtual machine as recited in claim 33 wherein the connection object includes a virtual port number and a physical port number.

35. A system for virtualizing a locally initiated outbound connection from a physical machine used to implement a virtual machine as recited in claim 33, wherein the computer code further comprises computer instructions for intercepting a data packet having a data packet source IP address that matches the physical IP address and translating the data packet source IP address to the virtual IP address.

36. A system for virtualizing a locally initiated outbound connection from a physical machine used to implement a virtual machine as recited in claim 32 wherein the static physical machine object contains a pointer to a physical machine object.

37. A system for virtualizing a locally initiated outbound connection from a physical machine used to implement a virtual machine as recited in claim 36 wherein providing a static physical machine object further includes specifying a physical machine port and searching among a plurality of physical machine objects for a matching physical machine object that matches the physical machine IP address and the physical machine port.

38. A system for virtualizing a locally initiated outbound connection from a physical machine used to implement a virtual machine as recited in claim 37, wherein the computer code further comprises computer instructions for storing a pointer to the matching physical machine object in the static physical machine object.

39. A system for virtualizing a locally initiated outbound connection from a physical machine used to implement a virtual machine as recited in claim 38 wherein the pointer to the matching physical machine object is used to increment a connection counter in the physical machine object when the connection object is created.

40. A system for virtualizing a locally initiated outbound connection from a physical machine used to implement a virtual machine as recited in claim 39 wherein the connection counter also counts inbound connections made to the physical machine.

41. A system for virtualizing a locally initiated outbound connection from a physical machine used to implement a virtual machine as recited in claim 37 wherein the matching physical machine object is used to load balance inbound connections from a foreign IP address.

42. A system for virtualizing a locally initiated outbound connection from a physical machine used to implement a virtual machine as recited in claim 36 wherein the physical machine object includes a counter that keeps track of the number of connections made to the physical machine object.

43. A system for virtualizing a locally initiated outbound connection from a physical machine used to implement a virtual machine as recited in claim 42 wherein the number of connections made to the physical machine object include inbound connections to the virtual machine handled by the physical machine.

44. A system for virtualizing a locally initiated outbound connection from a physical machine used to implement a virtual machine as recited in claim 43 wherein the computer code further comprises computer instructions for incrementing the counter when the connection object for handling outbound connections from the physical machine IP address is created.

45. A system for virtualizing a locally initiated outbound connection from a physical machine used to implement a virtual machine as recited in claim 32 wherein the outbound connection from the physical machine is counted along with inbound connections made to the physical machine for the purpose of load balancing new incoming connections.

46. A system for virtualizing a locally initiated outbound connection from a physical machine used to implement a virtual machine, comprising:

means for providing a virtual machine object having a virtual IP address that corresponds to the virtual machine wherein inbound connections directed to the virtual machine are handled by the physical machine having a physical machine IP address;

means for providing a static physical machine object wherein the static physical machine object contains the virtual IP address and the physical machine IP address;

means for intercepting a SYN packet for an outbound connection having a SYN packet source IP address that corresponds to the physical machine IP address and a packet destination address that corresponds to a foreign IP address;

means for determining that the packet source IP address matches the physical machine IP address; and means for creating a connection object for handling outbound connections from the physical machine IP address.

\* \* \* \* \*